(12) United States Patent
Lee (10) Patent No.: US 11,128,757 B2
(45) Date of Patent: Sep. 21, 2021

(54) METHOD AND APPARATUS FOR PROVIDING ROAMING SERVICE

(71) Applicant: Samsung Electronics Co., Ltd., Suwon-si (KR)

(72) Inventor: Ho-Yeon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/977,881

(22) Filed: May 11, 2018

(65) Prior Publication Data

US 2018/0332176 A1    Nov. 15, 2018

(30) Foreign Application Priority Data

May 12, 2017   (KR) ......................... 10-2017-0059470

(51) Int. Cl.
| | |
|---|---|
| *H04W 4/12* | (2009.01) |
| *H04M 15/00* | (2006.01) |
| *H04W 8/08* | (2009.01) |
| *H04W 4/24* | (2018.01) |
| *H04W 8/18* | (2009.01) |
| *H04W 8/12* | (2009.01) |

(52) U.S. Cl.
CPC .......... *H04M 15/61* (2013.01); *H04M 15/73* (2013.01); *H04M 15/8038* (2013.01); *H04W 4/12* (2013.01); *H04W 4/24* (2013.01); *H04W 8/08* (2013.01); *H04W 8/12* (2013.01); *H04W 8/18* (2013.01); *H04M 2215/34* (2013.01)

(58) Field of Classification Search
CPC .. H04M 15/61; H04M 15/73; H04M 15/8038; H04W 4/12; H04W 4/24; H04W 8/08

USPC .................................................... 455/432.1
See application file for complete search history.

(56) References Cited

U.S. PATENT DOCUMENTS

| | | | |
|---|---|---|---|
| 6,493,547 B1 | 12/2002 | Raith | |
| 9,065,934 B2 | 6/2015 | Lehtonen et al. | |
| 2009/0052393 A1 | 2/2009 | Sood et al. | |
| 2013/0005298 A1* | 1/2013 | Lehtonen | H04M 15/28 455/406 |
| 2013/0017803 A1 | 1/2013 | Li et al. | |

(Continued)

FOREIGN PATENT DOCUMENTS

| | | |
|---|---|---|
| CN | 102783195 A | 11/2012 |
| EP | 1179262 A1 | 2/2002 |
| KR | 10-1386521 B1 | 4/2014 |

(Continued)

OTHER PUBLICATIONS

ISA/KR, International Search Report and Written Opinion of the International Searching Authority for International Application No. PCT/KR2018/005462, dated Aug. 23, 2018, 11 pages.

(Continued)

*Primary Examiner* — Chuck Huynh (57) ABSTRACT

A method of a roaming user equipment (UE) according to an embodiment of the disclosure includes obtaining billing information of the roaming UE from a message received from a communication carrier server, sending a billing information authentication request message including the obtained billing information to an authentication server, and receiving an authentication result regarding whether the billing information is valid.

16 Claims, 8 Drawing Sheets

(56) References Cited

U.S. PATENT DOCUMENTS

2015/0223042 A1    8/2015  Li

FOREIGN PATENT DOCUMENTS

WO          00/70860 A1    11/2000
WO          03102730 A2    12/2003

OTHER PUBLICATIONS

Supplementary European Search Report dated Jul. 15, 2020 in connection with European Patent Application No. 18 79 9140, 10 pages.
The First Office Action dated Oct. 30, 2020 in connection with Chinese Application No. 201880031115.3, 14 pages.

* cited by examiner

METHOD AND APPARATUS FOR PROVIDING ROAMING SERVICE

CROSS-REFERENCE TO RELATED APPLICATIONS AND CLAIM OF PRIORITY

This application is based on and claims priority under 35 U.S.C. § 119 to Korean Patent Application No. 10-2017-0059470, filed on May 12, 2017, in the Korean Intellectual Property Office, the disclosure of which is incorporated herein by reference in its entirety.

BACKGROUND

1. Field

The disclosure relates to a method and apparatus for providing a roaming service in a communication system.

2. Description of Related Art

Along with the trend of a mobile communication technology toward development and globalization, there has emerged a roaming service that enables a user to use mobile communication by using a mobile phone number used in user's homeland, and recently, as the number of users visiting foreign countries on a trip, a business trip, or the like has increased steadily, the number of roaming users using the roaming service has also increased continuously.

Since a domestic mobile communication carrier provides the roaming service in service partnership with a mobile communication carrier in each foreign country without installing a separate base station in the foreign country, a different charging system than a domestic charging system is applied to the roaming service. Moreover, typically, a roaming service charge is more expensive than a domestic usage charge.

As such, since the roaming service has a different charging system and an expensive service charge, the user has become much interested in the roaming service charge, and generally, a communication carrier server informs the roaming user of the roaming service charge in the form of a text message.

The above information is presented as background information only to assist with an understanding of the disclosure. No determination has been made, and no assertion is made, as to whether any of the above might be applicable as prior art with regard to the disclosure.

SUMMARY

An embodiment of the disclosure provides a method and apparatus for authenticating whether billing information of a roaming terminal or user equipment (UE) is valid in a communication system.

An embodiment of the disclosure provides a method and apparatus for displaying billing information when a roaming UE executes an application in a communication system.

An embodiment of the disclosure provides a method and apparatus for calculating a communication usage charge of a roaming UE and verifying the calculated communication usage charge, by the roaming UE in a communication system.

An embodiment of the disclosure provides a method and apparatus for setting roaming service restriction on a charging category basis, by a roaming UE in a communication system.

An embodiment of the disclosure provides a method and apparatus for obtaining a list of data-free services provided by a communication carrier and displaying that an application corresponding to the data-free service is a data-free application, by a roaming UE in a communication system.

An embodiment of the disclosure provides a method and apparatus for selecting a roaming operator optimized for a roaming service user based on a service usage pattern of the roaming service user, by a roaming UE in a communication system.

A method of a roaming UE according to an embodiment of the disclosure includes obtaining billing information of the roaming UE from a message received from a communication carrier server, sending a billing information authentication request message including the obtained billing information to an authentication server, and receiving an authentication result regarding whether the billing information is valid.

A method for providing a roaming service by a server according to an embodiment of the disclosure includes receiving a billing information authentication request message including billing information of a roaming UE, determining whether the billing information of the roaming UE is valid based on the billing information of the roaming UE and billing information of communication carriers of a roaming region of the roaming UE, and transmitting an authentication result regarding whether the billing information of the roaming UE is valid to the UE.

A UE which is provided with a roaming service according to an embodiment of the disclosure includes a controller configured to obtain billing information of a roaming UE from a message received from a communication carrier server and a transceiver configured to send a billing information authentication request message comprising the obtained billing information to an authentication server and to receive an authentication result regarding whether the billing information is valid.

A server which provides a roaming service according to an embodiment of the disclosure includes a receiver configured to receive a billing information authentication request message comprising billing information of a roaming UE, a controller configured to determine whether the billing information of the roaming UE is valid based on the billing information of the roaming UE and billing information of communication carriers of a roaming region of the roaming UE, and a transmitter configured to transmit an authentication result regarding whether the billing information of the roaming UE is valid to the UE.

A method of a roaming UE according to an embodiment of the disclosure includes obtaining billing information of a roaming UE from a message received from a communication carrier server and displaying billing information corresponding to an application based on the billing information of the roaming UE when the application is executed in the roaming UE.

A roaming UE according to an embodiment of the disclosure includes a transceiver configured to receive a message comprising billing information of the roaming UE from a communication carrier server and a controller configured to obtain the billing information of the roaming UE and to display billing information corresponding to an application based on the billing information of the roaming UE when the application is executed in the roaming UE.

A method of a roaming UE according to an embodiment of the disclosure includes setting a usage limit amount of a roaming service for each billing category, based on billing information of the roaming UE obtained from a message received from a communication carrier server, calculating a cumulative charge for use of the roaming service for each billing category based on the billing information of the roaming UE, comparing a cumulative charge for use of a roaming service in a billing category corresponding to an application with a usage limit amount in the billing category corresponding to the application when the application is executed, and performing an operation corresponding to the application based on a comparison result.

A roaming UE according to an embodiment of the disclosure includes a transceiver configured to receive a message from a communication carrier server and a controller configured to set a usage limit amount of a roaming service for each billing category, based on billing information of the roaming UE obtained from a message received from a communication carrier server, to calculate a cumulative charge for use of the roaming service for each billing category based on the billing information of the roaming UE, to compare a cumulative charge for use of a roaming service in a billing category corresponding to an application with a usage limit amount in the billing category corresponding to the application when the application is executed, and to perform an operation corresponding to the application based on a comparison result.

A method of a roaming UE according to an embodiment of the disclosure includes obtaining list information of data-free services, associating the data-free services included in the list information with applications in the UE, and displaying that the associated applications are free of charge for data.

A roaming UE according to an embodiment of the disclosure includes a transceiver configured to obtain list information of data-free services and a controller configured to associate the data-free services included in the list information with applications in the UE and to display that the associated applications are free of charge for data.

A method of a roaming UE according to an embodiment of the disclosure includes analyzing services used by the roaming UE, selecting a roaming communication carrier optimized for the roaming UE based on the analyzed services, and accessing the selected roaming communication carrier.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

FIGS. 1A through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the following description of the disclosure, a detailed description of well-known functions or elements associated with the disclosure will be omitted if it unnecessarily obscures the subject matter of the disclosure. Hereinafter, embodiments of the disclosure will be described with reference to the accompanying drawings.

The following embodiments of the disclosure will be separately described for convenience, but at least two embodiments may be implemented in combination without colliding with each other.

Further, the terminologies to be described below are defined in consideration of functions in the embodiments of the disclosure and may vary depending on a user's or operator's intention or practice. Therefore, the terms should be defined based on the overall disclosure.

Various changes may be made to the disclosure and the disclosure may have various embodiments which will be described in detail with reference to the drawings. However, the embodiments according to the concept of the disclosure are not construed as limited to specified disclosures, and include all changes, equivalents, or substitutes that do not depart from the spirit and technical scope of the disclosure.

Although the terms such as "first" and "second" used in the various embodiments of the disclosure may modify various elements of the various embodiments, these terms do not limit the corresponding elements. These terms may be used for the purpose of distinguishing one element from another element. For example, a first element may be named as a second element without departing from the right scope of the various embodiments of the disclosure, and similarly, a second element may be named as a first element. The term "and/or" includes a combination of a plurality of related provided items or any one of the plurality of related provided items.

The terms used in the various embodiments of the disclosure are for the purpose of describing particular embodiments only and are not intended to be limiting. The singular forms are intended to include the plural forms as well, unless the context clearly indicates otherwise. The term "include" or "has" used in the various embodiments of the disclosure is to indicate the presence of features, numbers, steps, operations, elements, parts, or a combination thereof described in the specifications, and does not preclude the presence or addition of one or more other features, numbers, steps, operations, elements, parts, or a combination thereof.

The apparatus and method proposed in the disclosure are applicable to various communication systems such as a Long-Term Evolution (LTE) mobile communication system, an LTE-Advanced (LTE-A) mobile communication system, a high speed downlink packet access (HSDPA) mobile communication system, a high speed uplink packet access (HSDPA) mobile communication system, a high rate packet data (HRPD) mobile communication system of the 3GPP2, a wideband code division multiple access (WCDMA) mobile communication system of the 3GPP2, a code division multiple access (CDMA) mobile communication system of the 3GPP2, the Institute of Electrical and Electronics Engineers (IEEE) 802.16m communication system, an evolved packet system (EPS), a mobile Internet Protocol (IP) system, and so forth. The apparatus and method proposed in the disclosure are also applicable to a future $5^{th}$-generation (5G) mobile communication system.

Figure 1A:
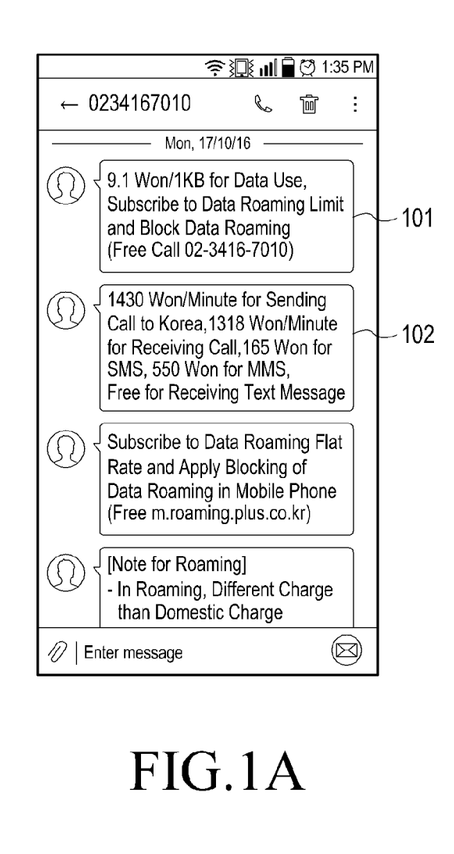
FIGS. 1A through 1C are views illustrating examples of an additional service related to roaming provided to a user in association with a charge of a current roaming service.
Figure 1B:
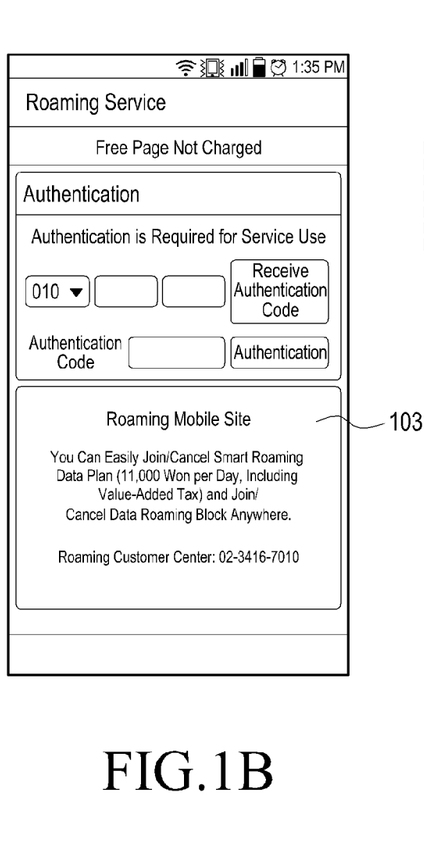
Figure 1C:
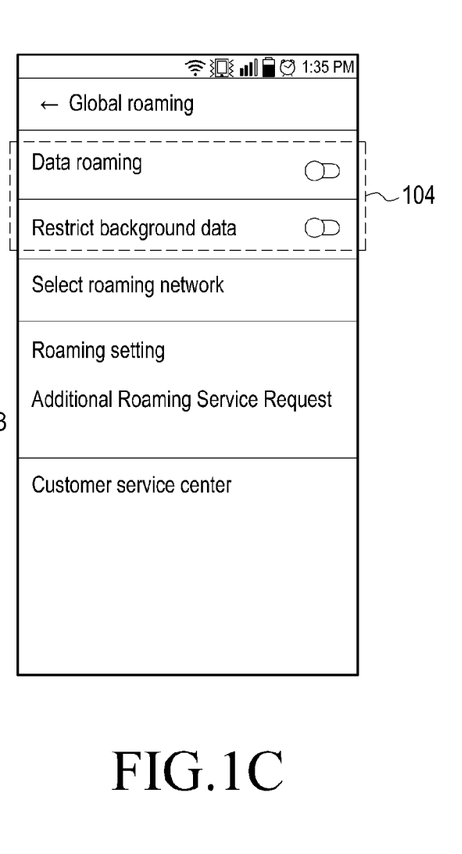

FIGS. 1A through 1C are views illustrating examples of an additional service related to roaming provided to a user in association with a charge of a current roaming service.

FIG. 1A illustrates an example in which a communication carrier server provides a user with information related to a roaming service such as a charging system of the roaming service or the like in the form of a text message. A text message 101 includes billing information "9.1 won/1 KB for data use", and a text message 102 includes billing information "1430 won/minute for sending a call to Korea, 1318 won/minute for receiving a call, 165 won for a short messaging service (SMS), 550 won for a multimedia messaging service (MMS), and a free charge for receiving a text message". The user may be aware of a charge per unit time from the billing information included in this text message, when using data or voice communication.

FIG. 1B illustrates an example of a subscription screen of a flat rate provided by a mobile communication carrier in a roaming service. Reference numeral 103 indicates that the user may subscribe to a flat rate product of 11000 won per day or a data roaming block service.

FIG. 1C illustrates a setting screen on which the user may block a roaming service on a terminal or user equipment (UE). That is, reference numeral 104 indicates a tap menu for activating/deactivating data roaming and background data.

The disclosure proposes various embodiments for information related to current roaming to a roaming UE described in FIGS. 1A through 1C.

Figures 2A, 2B:
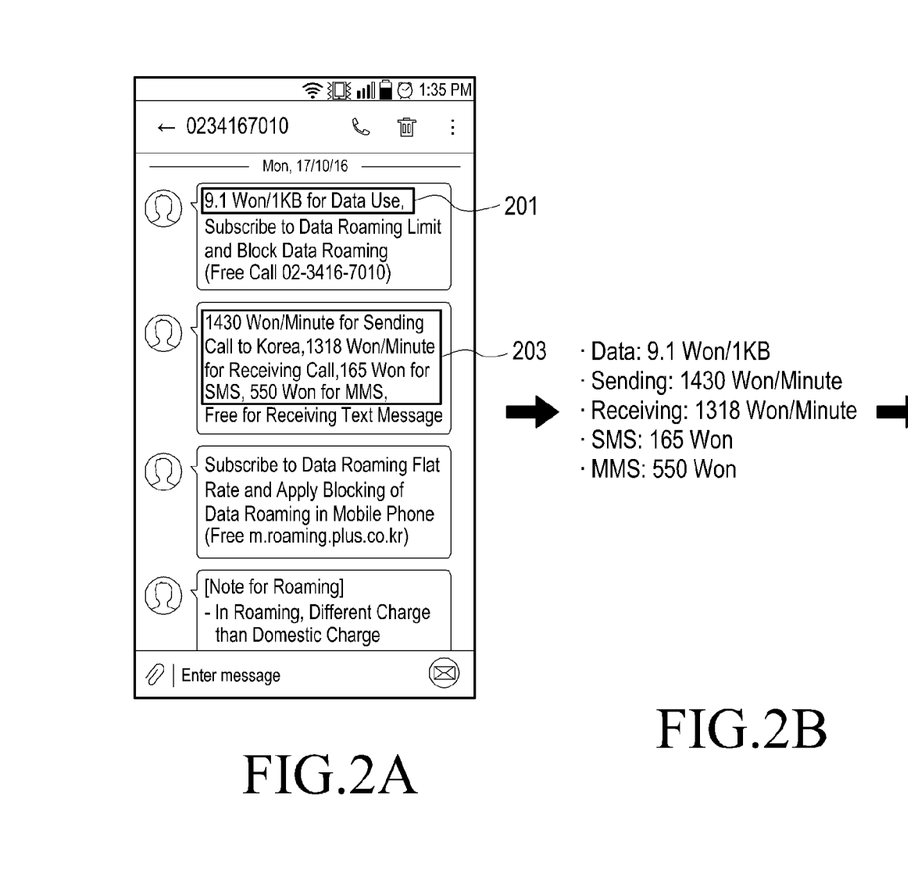
FIGS. 2A through 2C are views illustrating an embodiment of the disclosure.
Figure 2C:
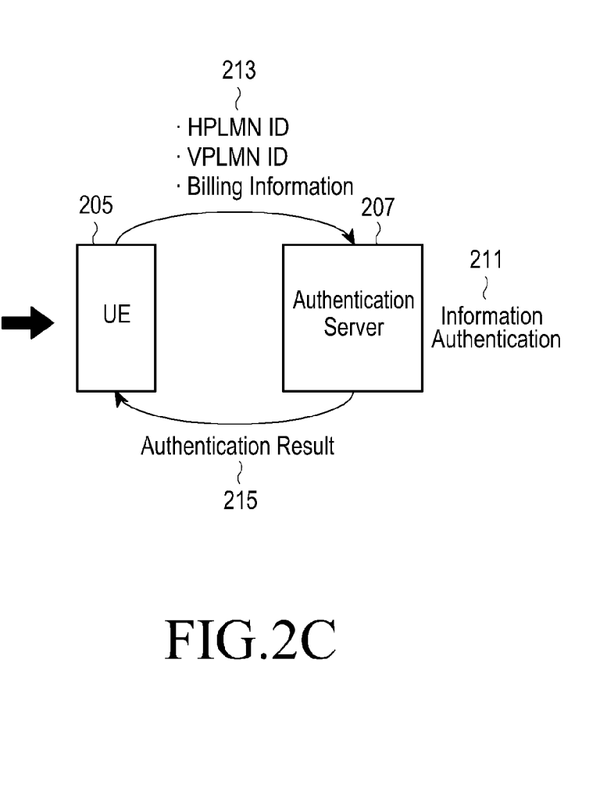

FIGS. 2A through 2C are views illustrating an embodiment of the disclosure.

In an embodiment, a UE extracts billing information from a text service including the billing information shown in FIG. 1A and transmits the extracted billing information to an information authentication server, and the information authentication server checks validity of the billing information and transmits a check result to the UE. The information authentication server may be a server managed by a UE manufacturer rather than a communication carrier (e.g., LG U+). However, the information authentication server is not limited to a UE manufacturer (e.g., Samsung Electronics, Co., Ltd.), and a managing entity is not necessarily limited as long as the validity of the billing information may be authenticated.

A charge of a text message received by the UE is free in global roaming, and thus anyone may send a text message. Since a user sending a text message may arbitrarily set a calling number, a roaming user may not determine merely based on the received text message whether the received text message is valid. Likewise, for a text message including billing information, a third party impersonating a common carrier to which the roaming user subscribes may transmit a spam message including the billing information and the user of the roaming UE may be exposed to a crime such as bank fraud or the like due to the spam message. Thus, the user of the roaming UE should verify the validity of the text message including the billing information. This embodiment has been proposed to verify the validity of the text message sent from the malicious third party as described above.

In FIG. 2A, which is the same as FIG. 1A, the roaming UE extracts billing information 201 and 202 included in the text message. FIG. 2B shows the extracted billing information.

FIG. 2C illustrates a procedure for verifying the validity of the extracted billing information.

In operation 211, the roaming UE sends a billing information authentication request message to an information authentication server 207. The billing information authentication request message includes the billing information, and a home public land mobile network (HPLMN) identifier (ID) and a visitor PLMN (VPLMN) ID of the roaming UE. For example, assuming that the UE subscribing to the common carrier LG U+ in Korea is being provided with a roaming service from AT&T in the USA, the billing information authentication request message includes a PLMN ID of LG U+ and a PLMN ID of AT&T.

In operation 213, the information authentication server 207 checks based on information included in the billing information authentication request message whether the billing information is valid. More specifically, the information authentication server 207 compares the billing information with billing information of a communication carrier (AT&T in the above example) corresponding to the VPLMN ID. The billing information of the communication carrier corresponding to the VPLMN ID may be stored in the information authentication server 207 in advance. To this end, the information authentication server 207 should previously obtain billing information of various communication carriers in the roaming area. However, the billing information of the communication carrier may be obtained from a communication carrier server after the request message is received. In operation 215, the information authentication server 207 transmits a validity check result to a UE 205.

It has been described in this embodiment that the information authentication is performed with respect to the billing information, but other information than the billing information may also be subject to validity check in a similar manner. As a representative example, when a text message including financial information (bank withdrawal information) is received, the user may transmit this financial information to the information authentication server to check the validity of the financial information.

Figure 3:
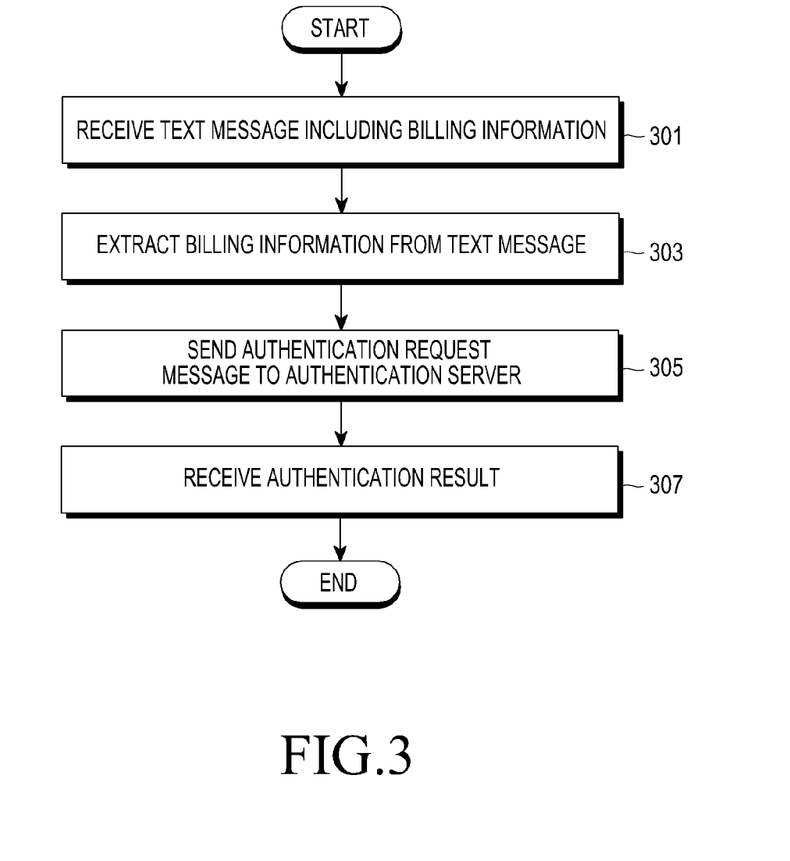
FIG. 3 is a flowchart illustrating operations of a roaming terminal or user equipment (UE) according to an embodiment of the disclosure.

FIG. 3 is a flowchart illustrating operations of a roaming UE according to an embodiment of the disclosure.

The roaming UE receives a text message including billing information in operation 301 and extracts the billing information from the text message in operation 303. The roaming UE sends an authentication request message including the billing information, and an HPLMN ID and a VPLMN ID of the roaming UE to the information authentication server in operation 305 and receives an authentication result of the billing information in operation 307.

The roaming UE sends a billing information authentication message to the information authentication server. The billing information authentication request message includes the billing information, and the HPLMN ID and the VPLMN ID of the roaming UE. For example, assuming that the UE subscribing to the common carrier LG U+ in Korea is being provided with a roaming service from AT&T in the USA, the billing information authentication request message includes a PLMN ID of LG U+ and a PLMN ID of AT&T.

It has been described in this embodiment that the information authentication is performed with respect to the billing information, but other information than the billing information may also be subject to validity check in a similar manner. As a representative example, when a text message including financial information (bank withdrawal information) is received, the user may transmit this financial information to the information authentication server to check the validity of the financial information.

Another embodiment extracts billing information from a text message including the billing information received from a communication carrier server and displays the billing information and/or cumulative billing information or the like when an application of a UE is executed.

FIGS. 4A through 4D are views illustrating another embodiment of the disclosure.

Figure 4A:
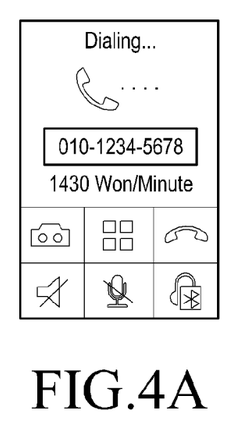
FIGS. 4A through 4D are views illustrating an embodiment of the disclosure.
Figure 4B:
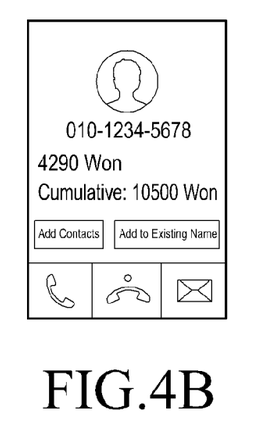
Figure 4C:
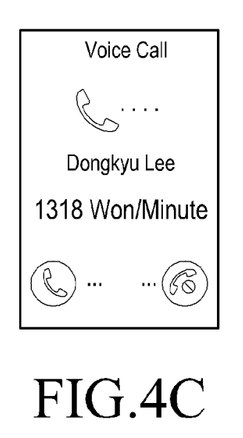
Figure 4D:
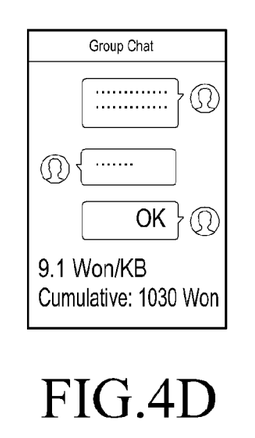

In FIG. 4A, when a user sends a call, per-minute billing information of an outgoing call is displayed on an execution screen of the outgoing call, and in FIG. 4B, when the call ends, total fee information of the call and a cumulative roaming charge are displayed. In FIG. 4C, when a call is received, per-minute billing information of the received call is displayed on an execution screen of the received call. In FIG. 4D, per-KB billing information and a cumulative data fee or charge are displayed on a screen of a messenger application.

To this end, the UE has to calculate a usage charge of an application during execution of the application by using the billing information received from a common carrier, and also has to calculate a total roaming charge.

In another embodiment, the cumulative fee calculated in another embodiment is transmitted to the communication carrier server for verification. Since the cumulative roaming charge calculated by the UE may be different from a fee actually charged by the communication carrier server, the former may be verified and the actual cumulative fee is notified to the user.

Figure 5:
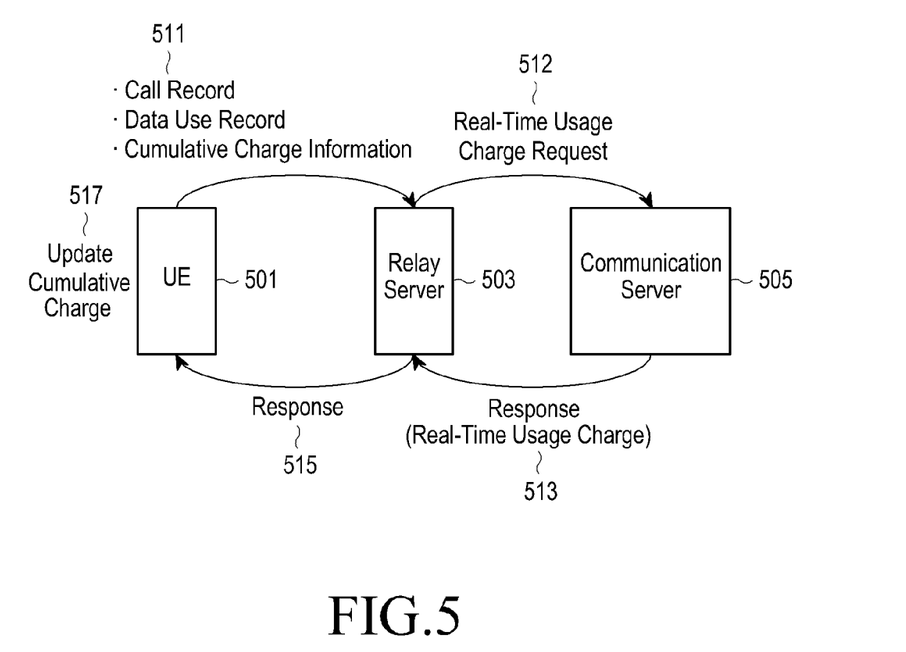
FIG. 5 is a view illustrating an operation of an embodiment of the disclosure.

FIG. 5 is a view illustrating operations of another embodiment of the disclosure.

In operation 511, a UE 501 sends a charge verification request message including a UE identifier to a relay server 503. The charge verification request message may include at least one of a call record, a data usage record, and cumulative charge information of the UE 501. In operation 513, the relay server 503 sends the charge verification request message to a communication carrier server 505. The communication carrier server 505 responds to the relay server 503 with a real-time usage charge of the UE 501. The relay server 503 sends a response message with respect to the charge verification request message to the UE 501. The response message sent to the UE 501 may include information indicating a real-time usage charge to the user, such as real-time usage charge information, a difference between a cumulative charge calculated by the UE 501 and the real-time usage charge information, and so forth.

The relay server 503 is typically managed by a manufacturer (e.g., Samsung Electronics Co., Ltd.), and when there is no relay server 503 in FIG. 5, the UE 501 may directly request the real-time charge information from the communication carrier server 505. In FIG. 5, the relay server 503 is included for a reason described below.

That is, when the UE 501 directly requests the real-time charge information from the communication carrier server 505, data usage may be charged. However, since a data charge is expensive for global roaming, the user is not highly likely to use such a service if an additional fee is charged for a real-time charge information request. Thus, if a UE manufacturer manages a relay server and bears a burden of data usage in wireless communication between the relay server and the UE, then the user may request real-time charge information without additional charge.

In another embodiment, roaming service blocking is set for each billing category based on charge information obtained in another embodiment.

Figure 6A:
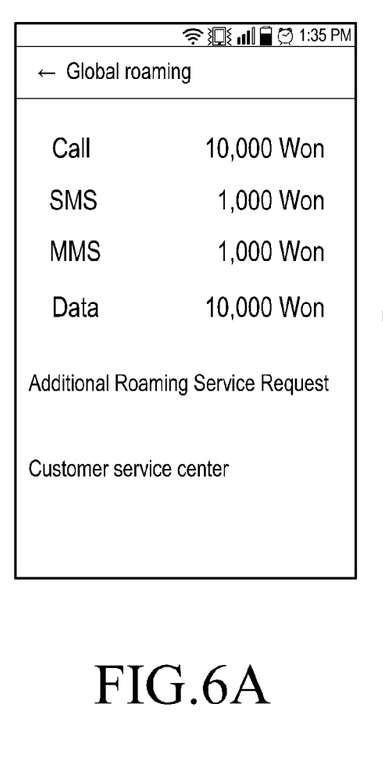
FIGS. 6A through 6C are views illustrating an embodiment of the disclosure.
Figure 6B:
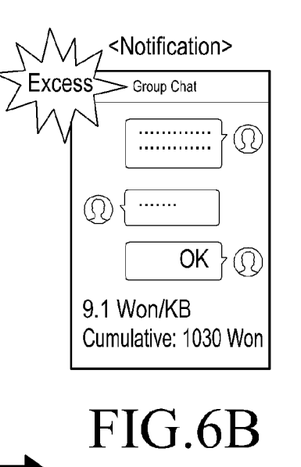
Figure 6C:
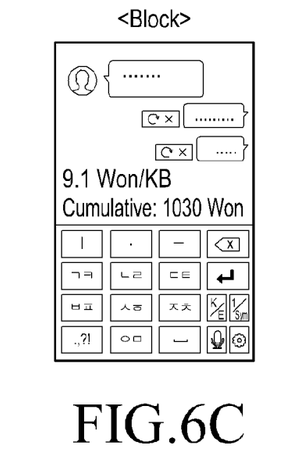

FIGS. 6A through 6C are views illustrating another embodiment of the disclosure.

FIG. 6A shows a setting menu related to global roaming of a UE described above with reference to FIG. 1C, in which a usage limit amount is set for each billing category. A usage amount limit for each billing category may be set by default or by a user. However, depending on a case, the limit amount may be set for each application rather than each billing category.

FIGS. 6B and 6C shows operations of the UE when during execution of a messenger service, a limit amount set for that application exceeds, based on a limit amount set for each application. In FIG. 6A, the limit amount of "data" is set to 10000 won, and if a cumulative charge of data usage exceeds the limit amount 10000 won during execution of the messenger application (for example, the charge of 1030 won), then a message indicating that the cumulative charge exceeds 10000 won may be displayed as shown in FIG. 6B or the messenger application may be stopped as shown in FIG. 6C.

Figure 7:
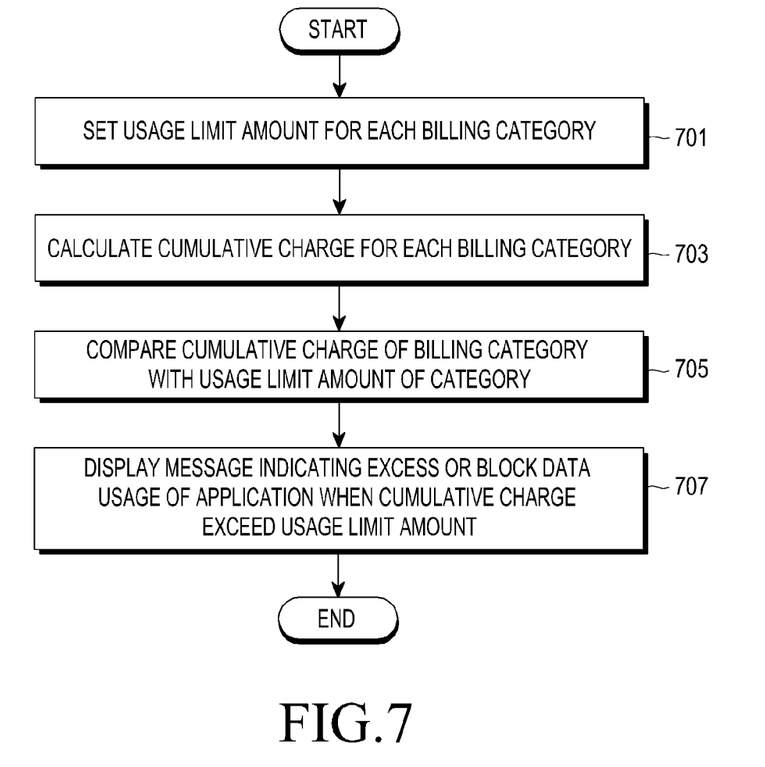
FIG. 7 is a flowchart illustrating operations of a UE according to an embodiment of the disclosure.

FIG. 7 is a flowchart illustrating operations of a UE according to an embodiment of the disclosure.

In operation 701, the UE sets a usage limit amount for each billing category according to user's setting or by default. In operation 703, the UE calculates a cumulative charge for each billing category based on billing information received from a communication carrier. In operation 705, when an application is executed, the UE compares a cumulative charge of a billing category corresponding to the application with a usage limit amount of the category. In operation 707, if the cumulative charge exceeds the usage limit amount, the UE performs an operation corresponding to setting. That is, a message indicating the excess may be displayed on the application screen or data usage by the application may be blocked.

In another embodiment of the disclosure, a list of data-free services provided by a communication carrier is notified to the UE that then displays that an application corresponding to the data-free service is a data-free application. Hereinbelow, this embodiment will be described.

An over the top (OTT) service refers to a service in which a communication or broadcasting operator or third-party operators provide contents through the Internet. Applications used in a smart phone are representative examples of the OTT service. However, to increase the number of users using services provided by a communication carrier, the communication carrier may not charge for data corresponding to a particular one of those services. Especially for overseas roaming, a data charge level is high, such that the user is highly likely to more frequently use services that are free of charge for data. Meanwhile, in the 3GPP, services that are free of charge for data are called "exempt services". Hereinbelow, services that are not charged for data will be referred to as "data-free services".

An embodiment proposes a scheme in which the UE obtains list information of a data-free service and displays applications available to the UE without any charge for data by using the list information.

In an embodiment, the following are examples of a way for the UE to obtain list information of a data-free service.

The UE obtains the list information from a home network of the UE. More specifically, the 3GPP specifies that the information is transmitted to the UE through non-access stratum (NAS) or open mobile alliance-device management (OMA-DM) or the information is previously stored in a universal subscriber identity module (USIM) of the UE. For reference, the NAS refers to a set of protocols used to deliver non-radio signaling between a user equipment (UE) and a mobility management entity (MME) for LTE/evolved UMTS terrestrial radio access network (E-UTRAN) connection, or a set of protocols used to deliver non-radio signaling between a UE and an access and mobility management function (AMF) for 5G system connection. The term indicating AMF may vary with the development of 5G system standards defined in the 3GPP. In one embodiment, the UE receives a separate message (e.g., a text message) including the list information from a communication carrier server. In the disclosure, there is no special limitation on a scheme to obtain the list information.

The UE obtains the list information of the data-free services and associates the data-free services included in the list information with applications in the UE, in which the following are examples of a scheme to associate the data-free services with the applications.

The first scheme is connecting a data-free service with an access point name (APN). The APN is information indicating a data network to be used by a UE when the UE requests a session from a network. When the data-free service is associated with the APN, applications using the APN are data-free applications.

The second scheme is connecting a data-free service with a server-side Internet protocol (IP) address. That is, when the UE uses an IP of a particular server as a destination IP, an application using the IP of the particular server is a data-free application.

The third scheme is directly connecting a data-free service with a particular application. For example, when specific applications provided by a communication carrier are set to be free of charge for data, those applications are data-free applications.

As described above, after obtaining the list information of the data-free services and associating the services included in the obtained list information with applications, the UE has to indicate to the user that the data-free applications are free of charge for data.

Figure 8A:
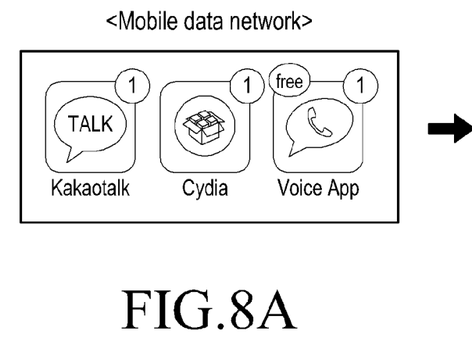
FIGS. 8A and 8B are views illustrating an example of a data-free application in an embodiment of the disclosure.
Figure 8B:
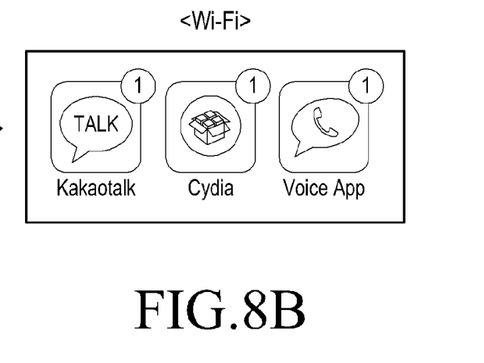

FIGS. 8A and 8B are views illustrating an example of a data-free application in an embodiment of the disclosure.

FIG. 8A shows an example in which the UE displays a data-free application when being on a mobile communication network. When the UE is on the mobile communication network, a normal application is charged for data, but the data-free application is not charged for data. For example, in FIG. 8A, a voice application is indicated as being "free".

FIG. 8B shows an example where the UE is located on a Wi-Fi network on which any application is free of charge for data and thus "free" is not indicated.

Figure 9:
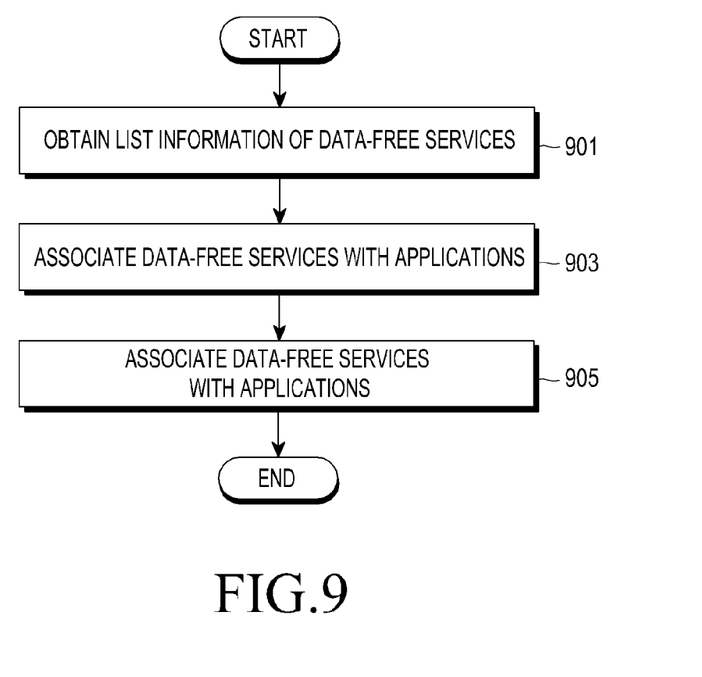
FIG. 9 is a flowchart illustrating operations of a UE according to an embodiment of the disclosure.

FIG. 9 is a flowchart illustrating operations of a UE according to an embodiment of the disclosure.

In operation 901, the UE obtains list information of data-free services.

In operation 903, the UE connects the data-free services with its own applications. The connection may be performed by one of the above-described schemes, that is, connection to an APN, a server IP, or an application provided by a communication carrier. Operation 903 may be set prior to operation 901.

In operation 905, the UE displays that data-free applications are free of charge for data. However, when the UE is located in a data-free region, the operation of displaying the indication that the applications are free of charge for data may not be performed.

In another embodiment, a roaming operator optimized for a roaming service user is selected based on a service usage pattern of the roaming service user.

When a UE subscribing to one home operator domestically performs overseas roaming, the UE may be provided with a roaming service through a plurality of overseas communication carriers. Generally, the UE is connected with a default operator or a communication operator having the highest signal strength in a roaming region. However, since roaming communication carriers may have different billing systems, a communication service charge may be saved by selecting a roaming operator optimized for a user based on a pattern in which a roaming UE uses roaming services in a foreign country.

For example, communication carriers optimized for a user may be different between when the user uses much data and when the user uses much voice communication. In this regard, the UE may analyze a usage pattern of a communication service to select an optimal communication carrier or may transmit usage pattern information to a separate relay server which then selects an optimal communication carrier and notifies the UE of the selected communication carrier. Referring back to FIGS. 1A through 1C, for example, in a "Select roaming network" menu of FIG. 1C, once a list of PLMNs to which the UE is currently connectible and billing information provided by each PLMN are provided together, a user of the UE may select a proper communication carrier based on the provided billing information. Alternatively, instead of the user selecting the communication carrier, the UE may analyze a user's usage pattern of a communication service and display billing information provided by a PLMN and PLMN information proper for the usage pattern of the communication service of the user based on the analysis. For example, assuming that a PLMN A and a PLMN B are currently connectable PLMNs, and the PLMN A charges more for data, but less for voice communication, than the PLMN B, the user using much data may connect to the PLMN A and the user using much voice communication may connect to the PLMN B, thereby reducing a roaming charge.

Figure 10:
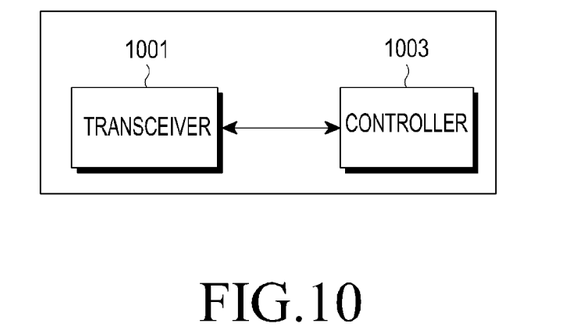
FIG. 10 illustrates a block diagram of a UE that performs operations according to embodiments of the disclosure.

FIG. 10 illustrates a block diagram of a UE that performs operations according to embodiments of the disclosure.

A transceiver 1001 performs data transmission and reception with external entities.

A controller 1003 controls overall operations of the UE described above in the foregoing embodiments. For example, the controller 1003 may extract billing information from a text message and generate an authentication request message. In an embodiment, in execution of a particular application, the controller 1003 may display the extracted billing information. When a particular application is executed, the controller 1003 may calculate and display cumulative charge information corresponding to the application. In an embodiment, the controller 1003 may set a roaming service limit for each billing category based on the obtained charge information. In an embodiment, the controller 1003 may associate data-free services with applications based on data-free service list information, and display that the associated data-free applications are free of charge for data. In an embodiment, the controller 1003 may also analyze a user's usage pattern of a communication service and select a roaming communication carrier optimized for the usage pattern. Operations regarding the above-described embodiments have already been described in detail, and thus will not be described at this time.

Meanwhile, although not shown in separate drawings, the authentication server or the communication carrier server described in the foregoing embodiments may also include a transceiver and a controller which may perform the above-described operations of the authentication server or the communication carrier server.

Particular aspects of the disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the disclosure may be easily interpreted by programmers skilled in the art which the disclosure pertains to.

The apparatus and method according to an embodiment of the disclosure may be implemented by hardware, software, or a combination of hardware and software. Such arbitrary software may be stored, for example, in a volatile or non-volatile storage device (e.g., a read only memory (ROM), etc.), a memory (e.g., a random access memory (RAM), a memory chip, a memory device, or a memory integrated circuit (IC)), or a machine (e.g., computer) recordable optical or magnetic storage medium (e.g., a compact disk (CD), a digital versatile disk (DVD), a magnetic disc, a magnetic tape, etc.) regardless of its ability to erase or rewrite. It can be seen that the method according to the disclosure may be implemented by a computer or a portable terminal which includes a controller and a memory, and the memory is an example of a machine-readable storage medium which is suitable for storing a program or programs including instructions for implementing the embodiment of the disclosure.

Therefore, the disclosure includes a program including codes for implementing an apparatus or method claimed in an arbitrary claim and a machine (computer)-readable storage medium for storing such a program. The program may be electronically transferred through an arbitrary medium such as a communication signal delivered through a wired or wireless connection, and the disclosure properly includes equivalents thereof.

The apparatus according to an embodiment of the disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a roaming user equipment (UE), the method comprising:
receiving a text message from a server;
obtaining first billing information including a charge per unit from the text message;
executing an application of the roaming UE;
analyzing a usage pattern of the roaming UE, the usage pattern indicating whether the roaming UE uses more data service or more voice service in a roaming area;
selecting, from among a plurality of roaming operators having different billing systems, a roaming operator optimized for at least one communication service provided by the application of the roaming UE, based on the usage pattern;
accessing the selected roaming operator for the at least one communication service provided by the application;

calculating, based on the first billing information, second billing information corresponding to a usage charge of the at least one communication service provided by the application while the at least one communication service is provided by the application through the accessed roaming operator; and displaying the first billing information and the second billing information on an execution screen of the application while the at least one communication service is provided by the application, wherein the at least one communication service includes at least one of data communication or voice communication, and wherein the plurality of roaming operators comprises a first roaming operator and a second roaming operator, the first roaming operator configured to charge more for a data service, but less for a voice service than the second roaming operator.

2. The method of claim 1, further comprising:
obtaining a cumulative charge for use of the application based on the second billing information; and
displaying the cumulative charge on the execution screen of the application.

3. The method of claim 2, further comprising:
transmitting a real-time charge request message comprising information of the cumulative charge to the server; and
receiving a response message with respect to the real-time charge request message from the server,
wherein the real-time charge request message is transmitted via a relay server.

4. The method of claim 1, further comprising:
identifying a usage limit amount of a roaming service for each billing category, based on the first billing information of the roaming UE; and
obtaining a cumulative charge for use of the roaming service for each billing category based on the first billing information of the roaming UE.

5. The method of claim 4, further comprising:
displaying a message indicating an excess of the cumulative charge of the application over the usage limit amount or blocking data usage of the application, in response to the cumulative charge of the application exceeding the usage limit amount.

6. The method of claim 1, further comprising:
obtaining list information of data-free services;
identifying at least one application associated with the data-free services included in the list information; and
displaying an indication that the at least one application is free of charge for data,
wherein the data-free services and the at least one application are associated based on (i) one of an access point name (APN) and a server Internet protocol (IP) address, or (ii) whether an application is provided by a communication carrier.

7. The method of claim 1, further comprising:
transmitting a billing information authentication request message comprising the first billing information to an authentication server; and
receiving an authentication result regarding whether the first billing information is valid.

8. The method of claim 7, wherein the billing information authentication request message further comprises a home public land mobile network (HPLMN) identifier (ID) and a visitor PLMN (VPLMN) ID of the roaming UE, and wherein whether the first billing information is valid is determined based on the HPLMN ID and the VPLMN ID of the roaming UE.

9. A roaming user equipment (UE), the roaming UE comprising:
a display;
a transceiver; and
a controller configured to:
control the transceiver to receive a text message from a server,
obtain first billing information including a charge per unit time from the text message,
execute an application of the roaming UE,
analyze a usage pattern of the roaming UE, the usage pattern indicating whether the roaming UE uses more data service or more voice service in a roaming area,
select, from among a plurality of roaming operators having different billing systems, a roaming operator optimized for at least one communication service provided by the application of the roaming UE, based on the usage pattern,
access the selected roaming operator for the at least one communication service provided by the application,
calculate, based on the first billing information, second billing information corresponding to a usage charge of the at least one communication service provided by the application while the at least one communication service is provided by the application through the accessed roaming operator, and
control the display to display the first billing information and the second billing information on an execution screen of the application while the at least one communication service is provided by the application,
wherein the at least one communication service includes at least one of data communication or voice communication, and
wherein the plurality of roaming operators comprises a first roaming operator and a second roaming operator, the first roaming operator configured to charge more for a data service, but less for a voice service than the second roaming operator.

10. The roaming UE of claim 9, wherein the controller is further configured to:
identify a usage limit amount of a roaming service for each billing category, based on the first billing information of the roaming UE, and
obtain a cumulative charge for use of the roaming service for each billing category based on the first billing information of the roaming UE.

11. The roaming UE of claim 10, wherein the controller is further configured to:
display a message indicating an excess of the cumulative charge of the application over the usage limit amount or block data usage of the application, in response to the cumulative charge of the application exceeding the usage limit amount.

12. The roaming UE of claim 9, wherein the controller is further configured to:
obtain list information of data-free services,
identify at least one application associated with the data-free services included in the list information, and
display an indication that the at least one application is free of charge for data,
wherein the data-free services and the at least one application are associated based on (i) one of an access point name (APN) and a server Internet protocol (IP) address, or (ii) whether an application is provided by a communication carrier.

13. The roaming UE of claim 9, wherein the controller is further configured to:
  obtain a cumulative charge for use of the application based on the second billing information, and
  display the cumulative charge on the execution screen of the application.

14. The roaming UE of claim 13, wherein the controller is further configured to:
  control the transceiver to transmit a real-time charge request message comprising information of the cumulative charge to the server, and
  control the transceiver to receive a response message with respect to the real-time charge request message from the server,
  wherein the real-time charge request message is transmitted via a relay server.

15. The roaming UE of claim 9, wherein the controller is further configured to:
  transmit a billing information authentication request message comprising the first billing information to an authentication server; and
  receive an authentication result regarding whether the first billing information is valid.

16. The roaming UE of claim 15, wherein the billing information authentication request message further comprises a home public land mobile network (HPLMN) identifier (ID) and a visitor PLMN (VPLMN) ID of the roaming UE, and
  wherein the controller is further configured to identify whether the first billing information is valid based on the HPLMN ID and the VPLMN ID of the roaming UE.

* * * * *